(12) United States Patent
Rouse et al.

(10) Patent No.: US 6,672,152 B2
(45) Date of Patent: Jan. 6, 2004

(54) FLUSH SURFACE AIR DATA SENSOR (75) Inventors: Gordon F. Rouse, Arden Hills, MN (US); Paul B. DuPuis, Glendale, AZ (US); Steven H. Thomas, Brooklyn Center, MN (US)

(73) Assignee: Honeywell International Inc., Morrsitown, NJ (US)

( * ) Notice: Subject to any disclaimer, the term of this patent is extended or adjusted under 35 U.S.C. 154(b) by 0 days.

(21) Appl. No.: 10/036,615

(22) Filed: Dec. 21, 2001

(65) Prior Publication Data

US 2003/0115948 A1 Jun. 26, 2003

(51) Int. Cl.[7] .............................................. A63B 53/00
(52) U.S. Cl. ................. 73/170.02; 73/170.01; 73/170.13; 73/861
(58) Field of Search .................. 73/170.02, 170.13, 73/170.01, 861

(56) References Cited

U.S. PATENT DOCUMENTS

| 4,645,517 A | * | 2/1987 | Hagen et al. ................. 73/182 |
| 5,062,869 A | * | 11/1991 | Hagen ......................... 96/421 |
| 5,130,707 A | * | 7/1992 | Hagen ......................... 340/945 |
| 5,458,008 A | * | 10/1995 | Rassatt .................... 73/861.68 |
| 6,184,773 B1 | | 2/2001 | Bonne et al. |
| 6,322,247 B1 | | 11/2001 | Bonne et al. |

* cited by examiner

Primary Examiner—Edward Lefkowitz
Assistant Examiner—Alandra Ellington
(74) Attorney, Agent, or Firm—Schiff Hardin & Waite (57) ABSTRACT

An air data sensor for an aircraft has a flush mounted plate at the outside surface of the aircraft and a housing for the sensor within the aircraft below the plate. A plurality of holes in the plate provide air flow to a pressure sensor in the housing. To prevent water from reaching the sensor, a trap chamber is provided below the holes. Various contorted air flow paths are disclosed. The tube to the pressure sensor may be heated.

17 Claims, 9 Drawing Sheets

FLUSH SURFACE AIR DATA SENSOR

BACKGROUND OF THE INVENTION

1. Field of the Invention

The present invention relates generally to an air data sensor, such as for use on an aircraft, and in particular to an air data sensor which mounts flush with the surface of the aircraft.

2. Description of the Related Art

Aircraft utilize pressure sensors, for example, to measure air pressure data to determine various information on air speed, altitude, etc. It is an advantage for the air pressure sensor to lie below the surface of the aircraft so as to be resistant to damage from bird strikes, debris, and, in military aircraft, to present a minimal radar cross section.

Pressure sensors such as air pressure sensors of aircraft are subject to damage from water, such as salt water, which corrodes the electrical components of the sensor and shorten the sensor's usable life. Water on the sensor element of a pressure sensor causes the sensor to be sensitive to gravity and acceleration/deceleration. In an aircraft, this means that as the orientation of the aircraft changes and as the aircraft goes through airborne maneuvers, the air pressure sensor will record these changes as differences in air pressure. This can seriously degrade the air data measurements, which can have disastrous results for the aircraft.

SUMMARY OF THE INVENTION

The present invention, in one aspect, provides an air pressure sensor mounted flush with the surface of an aircraft. In a further aspect of the invention, a trap is provided within the aircraft surface to prevent liquids and debris from reaching the sensor element.

DETAILED DESCRIPTION OF THE PREFERRED EMBODIMENTS

Figure 1:
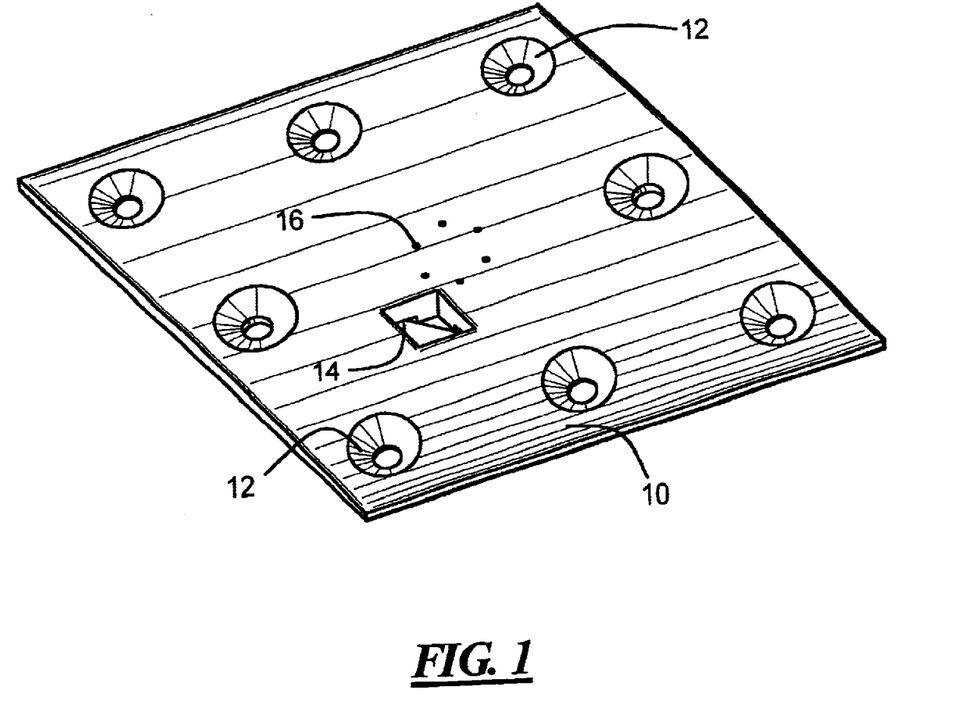
FIG. 1 is a perspective view of a plate which serves as the external surface of the present air data sensor.
Figure 2:
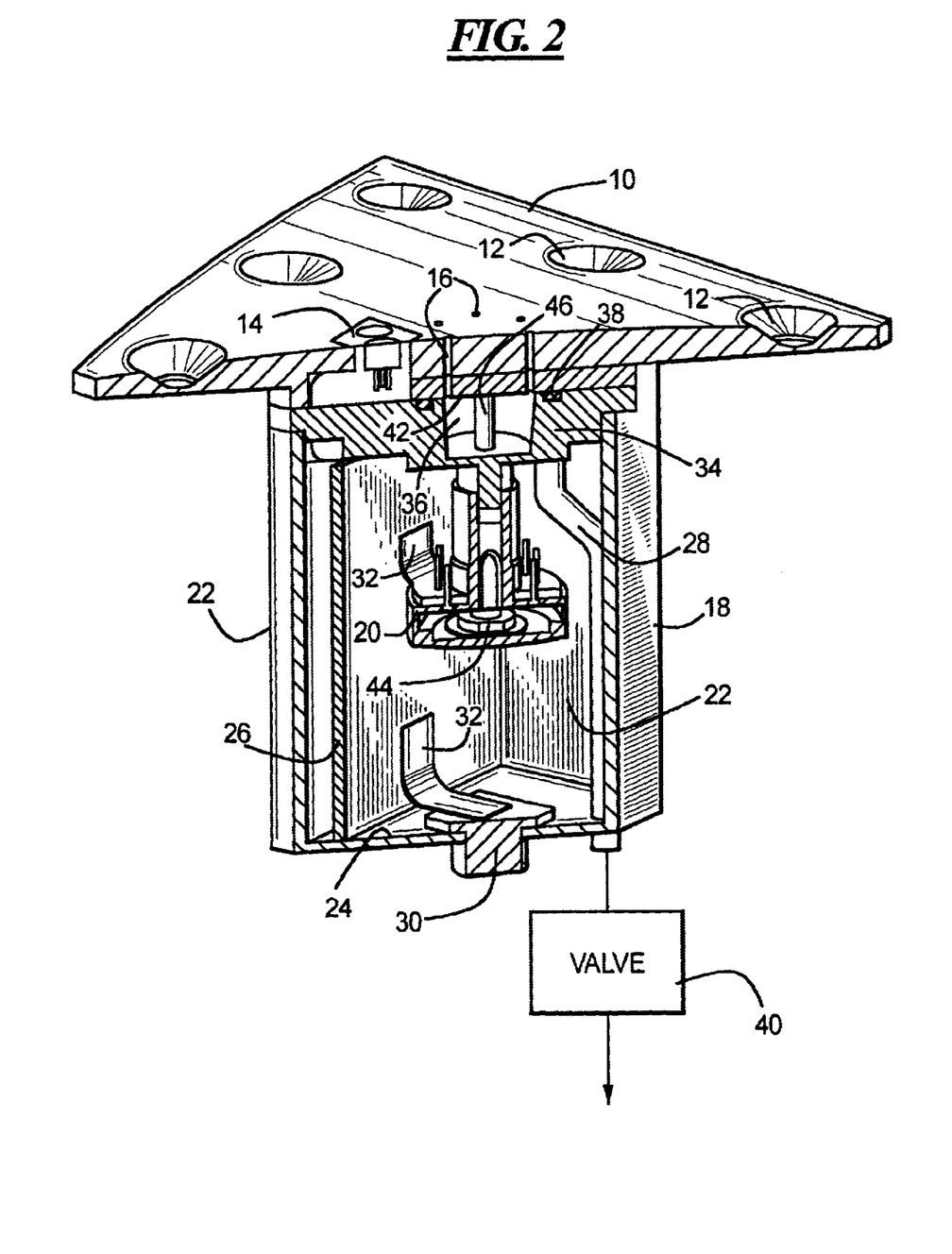
FIG. 2 is a perspective view, partially cut away, of a flush surface mount air data sensor according to the principles of the present invention.

Referring first to FIG. 1, the present air data sensor includes a plate 10 mounted flush with the surface of an aircraft. Recesses 12 for receiving screws or bolts for mounting of the sensor assembly in the aircraft are provided around the perimeter of the plate 10. The plate may have a flow sensor or in a preferred embodiment a pair of flow sensors mounted in a recess for a flow senor 14 (as shown in FIG. 2) therein and flush with the top surface of the plate 10, although a flow sensor is not necessary to the present invention. The flow sensor measures wind speed and possibly wind direction by thermal sensing, similar to a thermal anemometer. A pocket will also be provided for mounting the flush mount flow sensor. This pocket will be unique at each location because of the varying thickness of each plate. The flow sensor will be located with respect to the surface so that a flushness tolerance of less than 0.003" will be maintained. The flow sensor may be eliminated; or may be replaced by one or more further sensors. The plate 10 also has a circular arrangement of six holes 16 at the center of the plate 10.

As seen in FIG. 2, below the top plate 10 is provided a housing 18 for the air data sensor, which in the present embodiment is a pressure sensor 20. The housing 18 has side walls 22 that are secured to the underside of the plate 10 and a base, or bottom, 24 closing the bottom to form a pressure sensor compartment. Within the compartment are printed wiring boards 26 that are connected electrically to the flow sensor 14 if provided, a drain tube 28, and the pressure sensor element 20. A connector 30 is mounted at an opening in the bottom 24 by which electrical connections are made between the air data sensors and the instruments and controls of the aircraft. The connector 30 is designed to provide electromagnetic interference filtering. In one embodiment, two printed wiring boards 26 are mounted within the housing 18, but this depends upon the sensors used and the level of integration of the circuit elements, for example. The circuit boards 26 are connected by flex tape terminals 32 to the sensor element 20 and the connector 30.

The top of the housing assembly 18 is closed by a top element 34 which forms the trap 36. The top element 34 is sealed to the plate 10 by o-rings 38. In one example, the pressure sensor 20 is laser welded to the top element 34 to form a hermetic seal between the pressure sensor 20 and the pressure chamber.

The pressure sensor element 20 utilized in the preferred embodiment is a piezo-resistive pressure sensor of the type which is known, although other types of sensors may be used, including for example, an optical pressure sensor, etc. In one example, the pressure sensor is a Honeywell silicon piezo-resistive sensor, such as Honeywell part no. 22007075.

The drain tube 28 runs the length of the housing 18 and extends at one end through the bottom 24 of the housing 18. At the other end, the drain tube 28 is in communication with the trap 36 formed between an underside of the plate 10 and the top element or trap plate 34. A normally-closed solenoid controlled drain valve 40 connected to the drain tube is periodically activated to drain water from the trap 36. The drain tube 28 is preferably a non-collapsible tube.

The trap 36 includes a chamber below the plate 10 and is in communication with the outside of the aircraft through, in the illustrated embodiment, a circular arrangement of holes 16 formed through the plate 10. Six such holes 16 are provided in the preferred embodiment, although other numbers and arrangements of holes may be provided as well. The use of multiple holes 16 to the outside provides redundancy in the event that one or more of the holes becomes blocked with bugs, ice, sand, dust, volcanic ash, or other debris. The holes 16 of one embodiment are of 0.030 to 0.060 inches in diameter.

The trap chamber 36 provides a contorted flow path between the interior of the trap chamber and the pressure sensor 20. Water, in particular, and foreign matter, in general, may become drawn in or forced through the holes 16 from outside the aircraft. The trap compartment 36 traps the liquid and other foreign matter and prevents it from reaching the pressure sensor 20.

Figure 8:
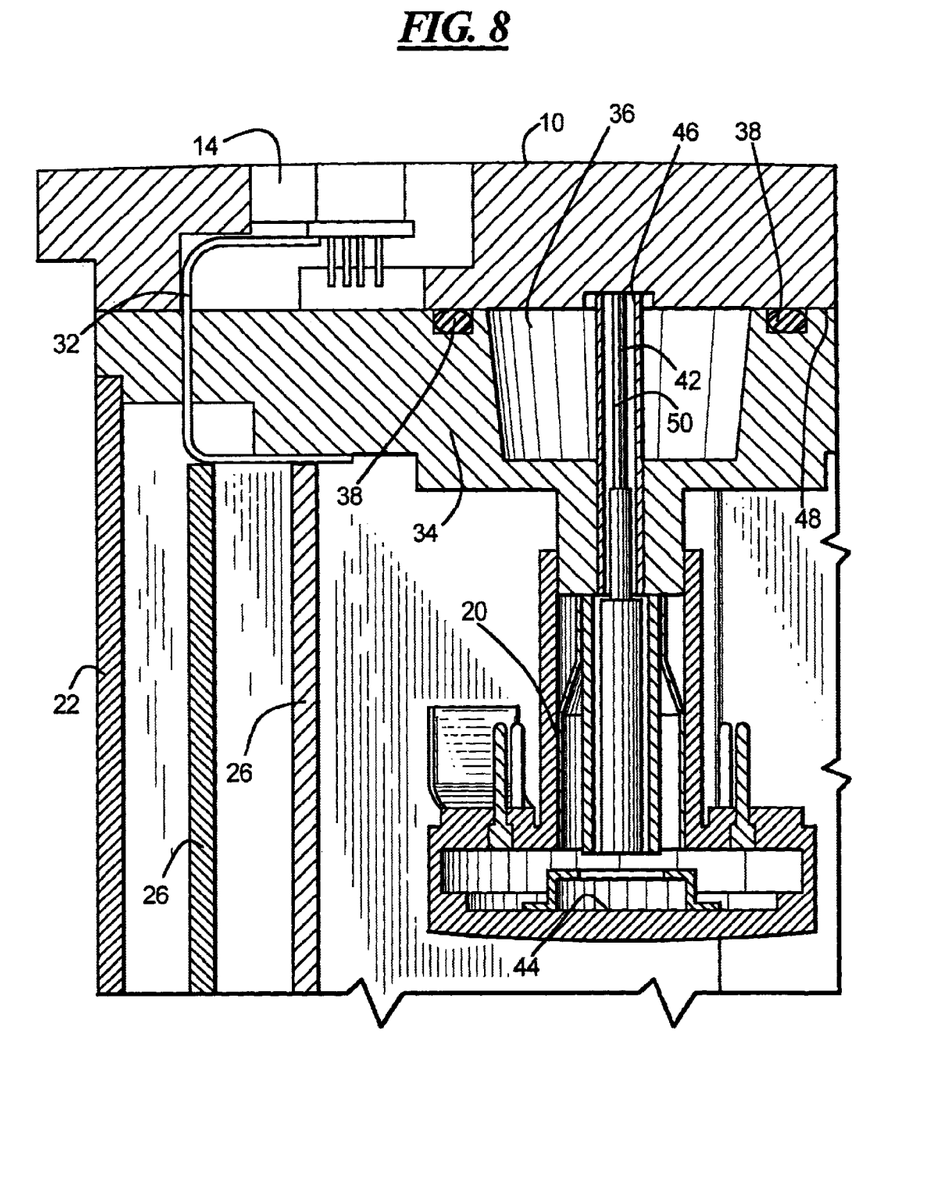
FIG. 8 is an enlarged view of the first embodiment.

In the illustrated embodiment of FIG. 2 and also shown in the enlargement of FIG. 8, a central hollow tube 42 extends from the sensor membrane 44 upward into the trap chamber 36. The tube 42 extends substantially for the full length of the trap chamber 36 and has an open end disposed in a recess 46 in the underside of the plate 10. The recess 46 in the underside of the plate 10 has a diameter only slightly larger than the outside diameter of the tube 42 so that a narrow annular passageway is formed therebetween. The tube 42 does not contact the bottom of the recess 46 so that an air passageway continues from the annular passageway around the end of the tube 42 and into the interior of the tube 42. The tube 42 provides an air passageway to the sensor element 44.

The first embodiment of the present invention thereby provides an air flow passageway from the exterior of the aircraft, through any or all of the six holes 16, into the interior of the trap chamber 36, along the narrow annular passageway, around the end of the tube 42, and along the interior of the tube 42 to the sensor 44. Water and other contaminants that make their way into the trap chamber 36 will be drawn out through the drain tube 28 that is in communication with the trap chamber 36 and thus are unlikely to follow the contorted pathway to the sensor 44. The sensor element 44 is thus kept clean and free of liquids, such as water.

The drain tube 18 is not required in every embodiment and may be done away with in some installations of the present sensor.

The present air data sensor is assembled by welding the pressure sensor to the pressure cover base.

Additional measures may be included to further ensure that water, in particular, does not reach the sensor element. First, a heating element 48 may be provided on the underside of the plate 10 to heat the plate 10. The heating element 48 may be a foil heater or a heating coil. Alternatively, the heating element may be embedded in the plate 10 itself. The heating of the plate 10 should be enough to melt any ice which may form on the plate 10, but may greater so as to speed the drying of any accumulated moisture on the outside surface of the plate 10 and/or in the holes 16. In one example, a 50 Watt heater applied to the underside of the plate 10 prevents ice build up on the plate 10. The heater of a preferred embodiment operates from 115 volt power, although other voltages are contemplated.

The present sensor 20 operates at 28 volts DC. Power consumption is low, less than 5 Watts.

As a further measure, the tube 42 leading to the sensor element 44 may be heated, such as by a heating element 50. The tube 42 is preferably heated to a temperature to vaporize any liquid water which may reach the interior of the tube 42. The small amount of water which may reach the tube 42 is prevented from flowing the length of the tube 42 and reaching the sensor element 44.

Yet a further measure is to form the elements in the air flow path, or at least the elements more proximate to the sensor element 44 along the flow path such as the tube 42, of a hydrophobic material. These elements may be made entirely of the hydrophobic material or may have a surface coating of a hydrophobic material. This discourages water from flowing to the pressure sensor.

Figure 4:
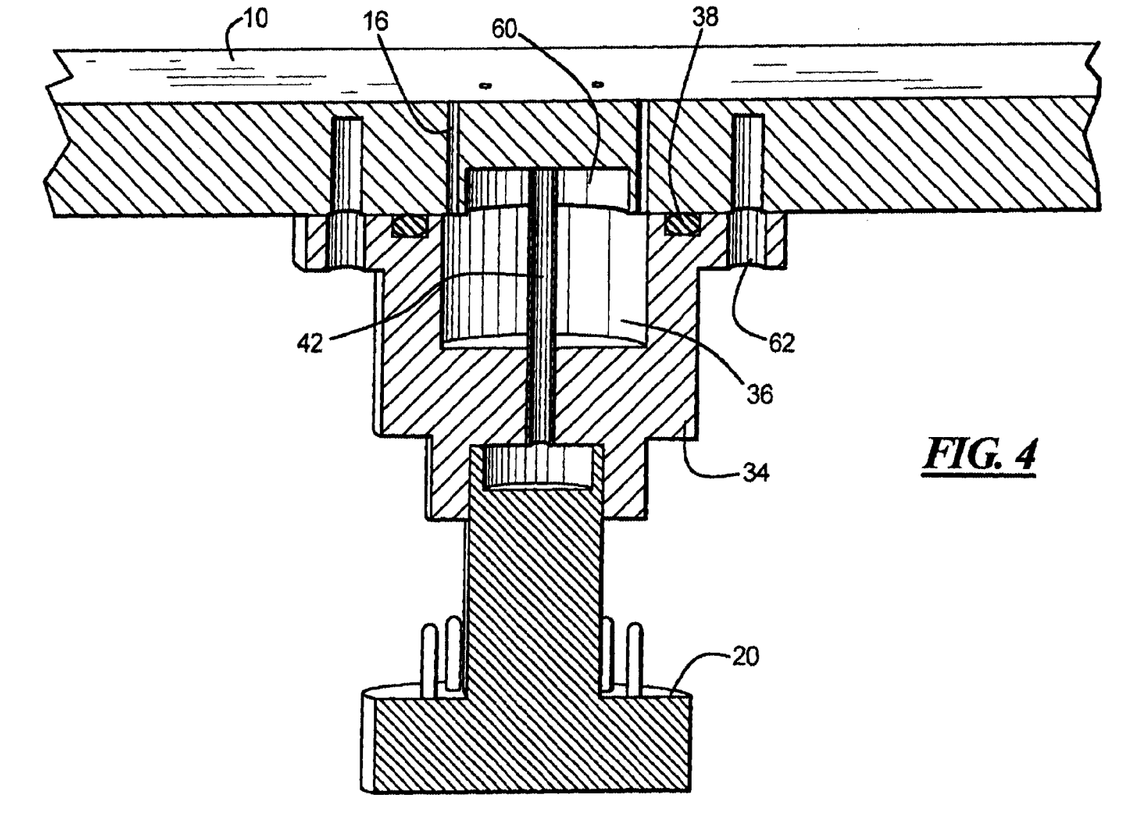
FIG. 4 is a side elevational view, partially in cross section, of an alternative embodiment of the present air data sensor housing.

It is contemplated that the narrow flow paths such as the gap 46 may permit water to move by capillary action and so defeat the purposes of the providing the constricted passageways as a means for blocking access to the sensor. Water trapped in the narrow passageways could flow in an unintended direction toward the sensor 44, and may slow the sensor response even if it only remains in place without moving. As such, a further embodiment of the invention as shown in FIG. 4 has been developed in which the narrow annular passageway to the free end of the tube 42 is replace by an enlarged annular passageway 60. No capillary action is possible in a passageway of such size.

Specifically, FIG. 4 shows the plate 10 with the holes 16 leading from the outside of the aircraft to the interior of the chamber 36. The tube 42 extends from the sensor unit 20 toward the plate 10 and into the annular passageway 60. The passageway 60 is of a sufficiently large diameter to avoid capillary action of the water at the free end of the tube 42. The passageway 60 is of a smaller diameter than the chamber 36 formed in the trap plate 34. As such, if water is carried toward top of the chamber by gravity or centrifugal force, for example, the water first encounters the holes 16 and may leave the chamber 36 before nearing the tube 42.

A consideration of the present invention is that the air data sensor may be mounted in various orientations on the surface of the aircraft, and further that the aircraft may occasionally fly in different orientations, even an inverted position. The sensor assembly must therefore accommodate water flow in an inverted position as well. As such, embodiments of the present air data sensor are configured to provide obstacles to the entry of water to the pressure sensor tube when the sensor assembly is mounted on a downward facing surface of the aircraft. Further, measures are provided to block water from entering the tube as the aircraft undergoes aerial maneuvers, including flying at steeply angled orientations and even in an inverted position. The embodiment of FIG. 4 is an example of such a sensor assembly.

The present sensor is flush with the outer skin of the aircraft and the sensing surface of the pressure sensor is concealed internally of the sensor assembly, so that the present sensor presents a minimal radar cross section. Further, the diamond shaped plate of the present sensor assembly minimizes radar cross section of the sensor. As such, the present air data sensor finds particular utility in aircraft having a reduced radar cross section and a low radar visibility.

Figure 3:
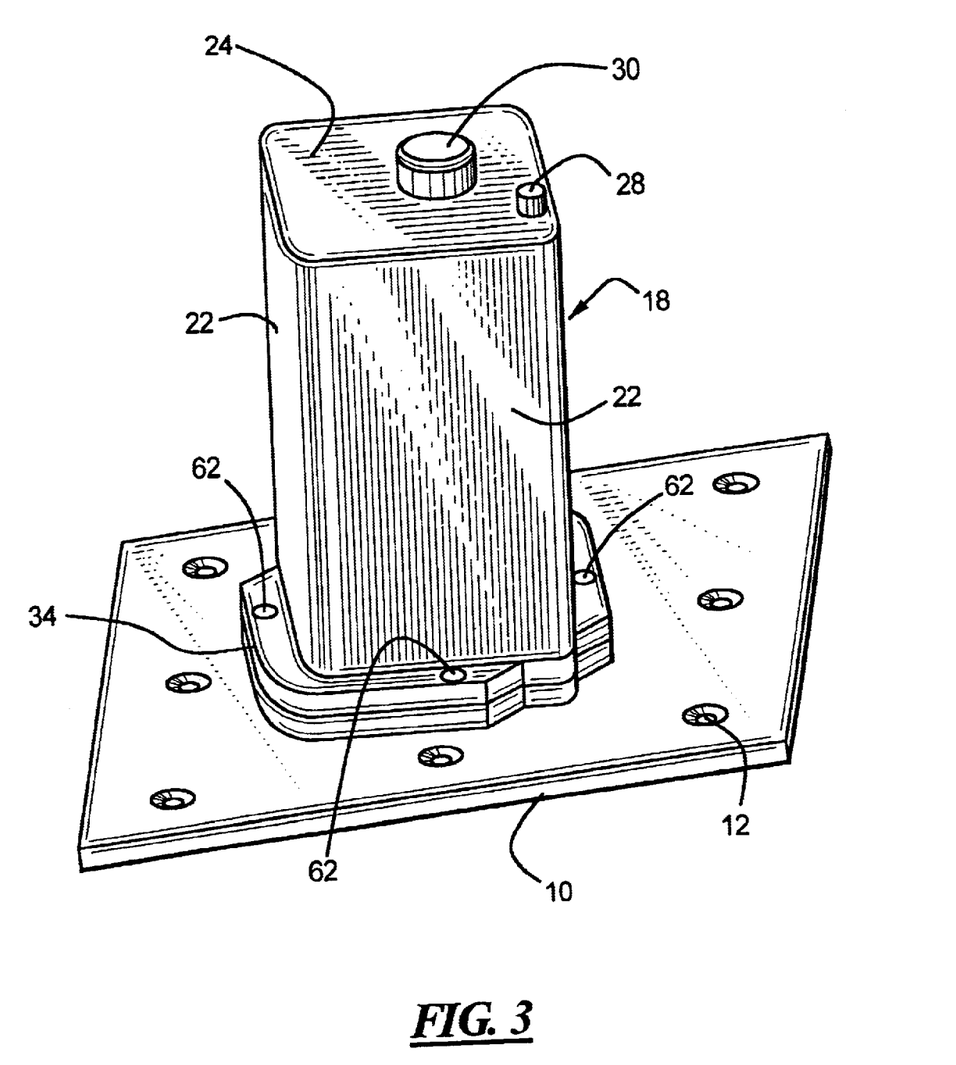
FIG. 3 is a perspective view of the present air data sensor in an inverted position.

FIG. 3 is a bottom view of the sensor assembly showing the housing 18 extending from the underside of the plate 10.

The housing is affixed to the plate by fasteners 62, such as screws and has the electrical connector 30 and drain tube 28 extending from the bottom 24. The view in FIG. 3 shows the portion extending into the aircraft. From the outside of the aircraft, only the top surface of the plate 10 would be visible.

To further accommodate the low visibility features of the present air data sensor, the top surface of the plate 10 may be coated with a paint or other coating which is non-reflective to radar.

The present air data sensor is configured for easy removal and replacement. In particular, the assembly is held in the aircraft by a series of bolts through the perimeter holes 12. Preferably, shear head titanium bolts to self-locking lugs are used to attach to the skin of the aircraft. The holes 12 are countersunk to enable the bolts to lie flush with the skin of the aircraft and thereby reduce the radar cross section as well. Removal of the present air data assembly is accomplished by removal of the perimeter bolts and lifting of the unit from the correspondingly shaped opening in the aircraft. The air data sensor is removed from electrical communication with the controls of the aircraft by disconnecting the single connector 30 at the bottom of the housing. In embodiments having a drain tube, a connection to the drain tube 28 may also require disconnection. The air data assembly is now free of the aircraft and is readily removed.

Replacement is accomplished by connecting a drain connector to the drain tube 28, if present, and fastening the electrical connector 30 at the bottom of the housing. By inserting the housing 18 into the aircraft body opening and positioning the plate 10 in the correspondingly shaped opening, the mechanic need only replace the bolts in the perimeter countersunk bores 12 for installation to be complete. Thus, removal and replacement is accomplished from outside the aircraft as opposed to servicing from within the aircraft, which provides considerable economic advantage.

Figure 5:
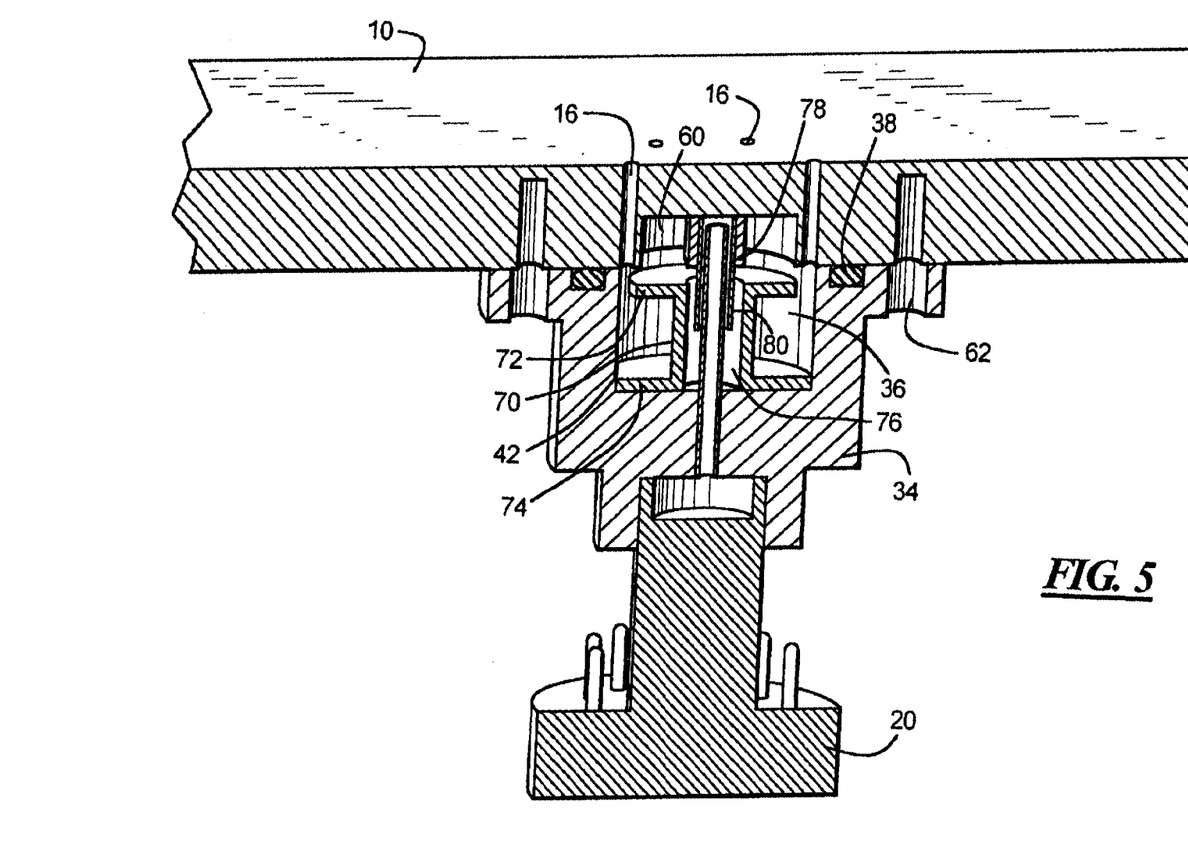
FIG. 5 is a side elevational view, partially in cross section, of a further embodiment of the present air data sensor housing.

Referring to FIG. 5, a further embodiment of the invention provides a further water traps to prevent liquids from entering the sensor space. The trap chamber 36 of the illustrated embodiment has a spool shaped deflector 70 with a top flange 72, a bottom flange 74 and a core 76. The top flange 72 is of a diameter less than the spacing of the holes 16 so that water entering the holes 16 bypasses the top flange 72. The bottom flange 74 prevents the water from entering the sensor space and is of the same diameter as the chamber 36. The water is held in the space outside the core 76 and is prevented from reaching the annular space 60 by the top flange 72. Instead, the top flange 72 directs the water toward the holes 16.

Any water that reaches the annular space 60 above the top flange 72 meets with a cylinder 78 on the underside of the plate 10. The cylinder 78 is relatively short but holds a smaller diameter tube 80 that extends coaxially of the tube 42 and into the hollow core 76 of the spool shaped deflector 70. The flow path for the air to the pressure sensor 20 is thus through the holes 16, into the chamber 36, into the annular space between the core 76 and the tube 80, into the annular space between the tube 80 and the tube 42, into the interior of the tube 42 and to the sensor 20.

Figure 6:
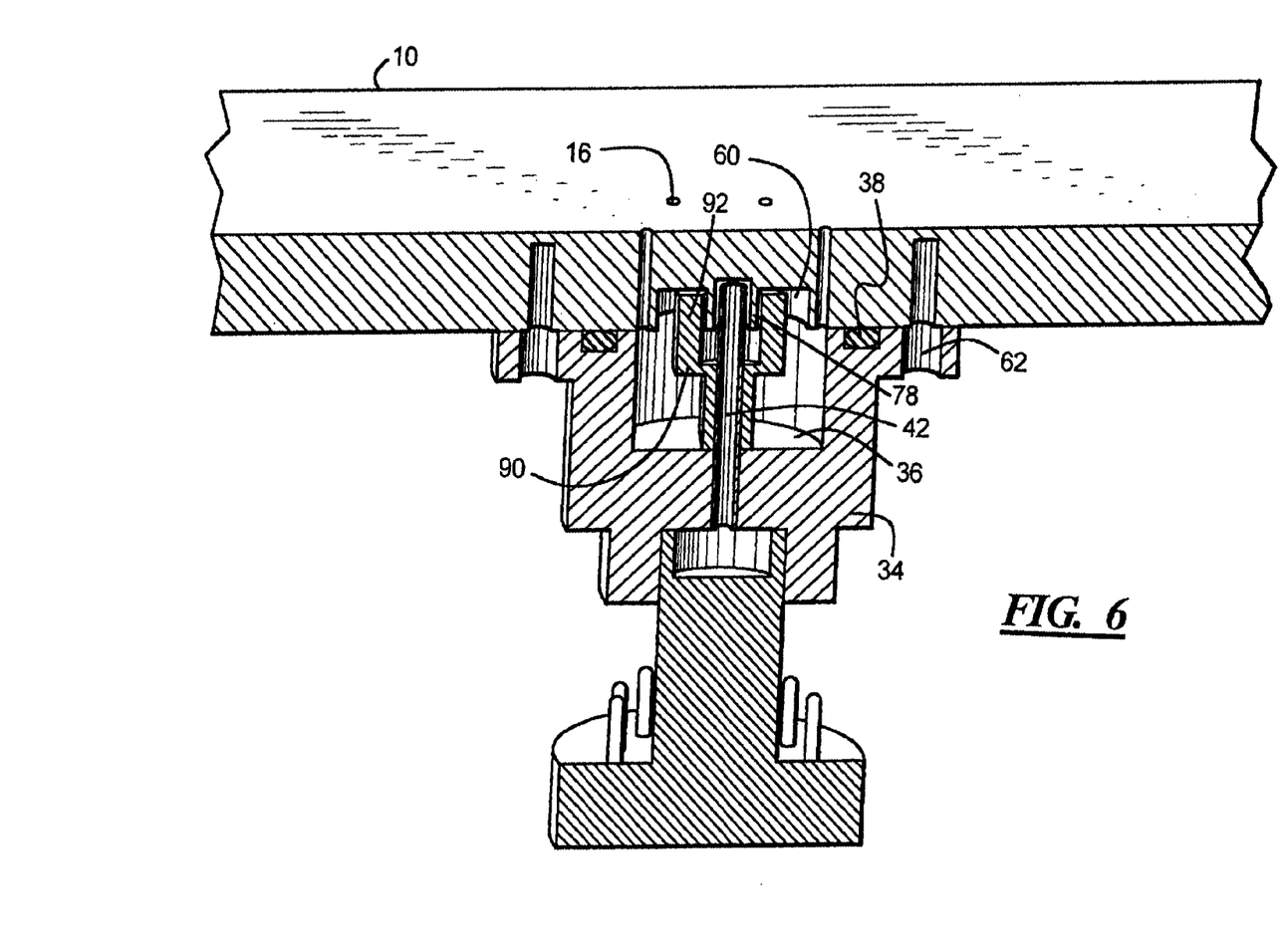
FIG. 6 is a side elevational view, partially in cross section, of another embodiment of the present air data sensor housing.

FIG. 6 shows another embodiment of the sensor assembly, in which the flow path to the sensor includes a cup element 90 extending about the cylinder 78. The cup element 90 has a base engaged about the tube 42 and a cup portion 92 extending to adjacent the underside of the plate 10 in the space 60. The cup portion is coaxial with the tube 42 and the cylinder 78, leaving an annual space between the interior of the cup portion 92 and the outside of the cylinder 78. The flow path continues into the interior of the cylinder 78 and then to the tube 42.

Figure 7:
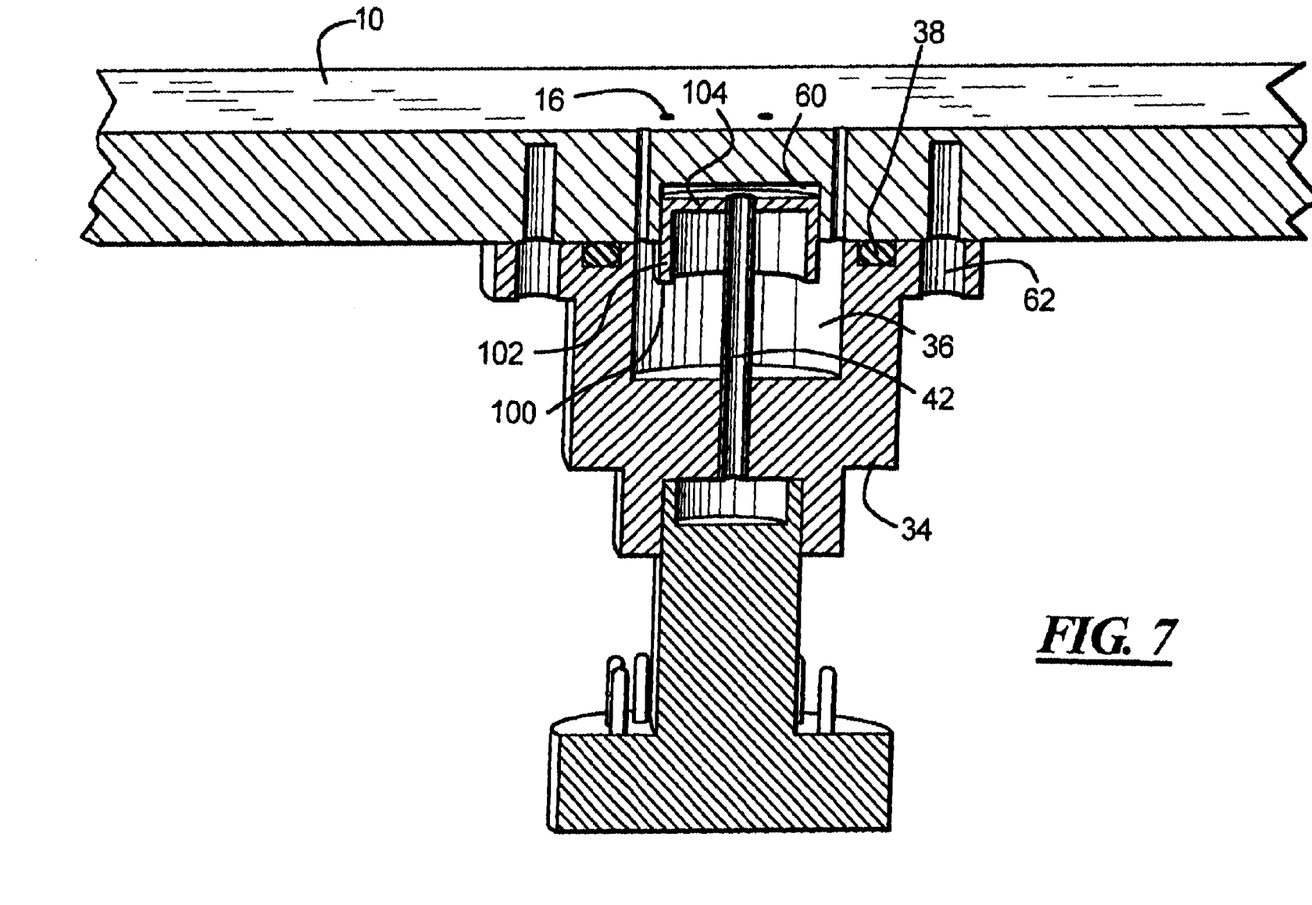
FIG. 7 is a side elevational view, partially in cross section, of yet a further embodiment of the present air data sensor housing.

FIG. 7 provides yet a further protection against water entry into the sensor space. The annular space 60 in the underside of the plate 10 has a piston element 100 fitted therein. The piston element 100 has side walls 102 extending higher than the underside surface of the plate 10 to present a barrier to water and direct the water to the holes 16. The piston element 100 has an end face 104 spaced from the underside surface of the plate 10 in the annular space 60 and flush with the free end of the tube 42. The piston element 100 may be heated to prevent moisture from entering the pressure sensor. Air passageways from the chamber 36 to the space above the piston element 100 are provided through the end face 104. In an alternative embodiment, air passageways are provided at gaps or channels between the side walls 102 of the piston element 100 and the sides of the annual space 60. It is also contemplated to direct the pressure sensor downward and to couple it to the airflow by a U-shaped path, or to direct the sensor at some other angle.

Figure 9:
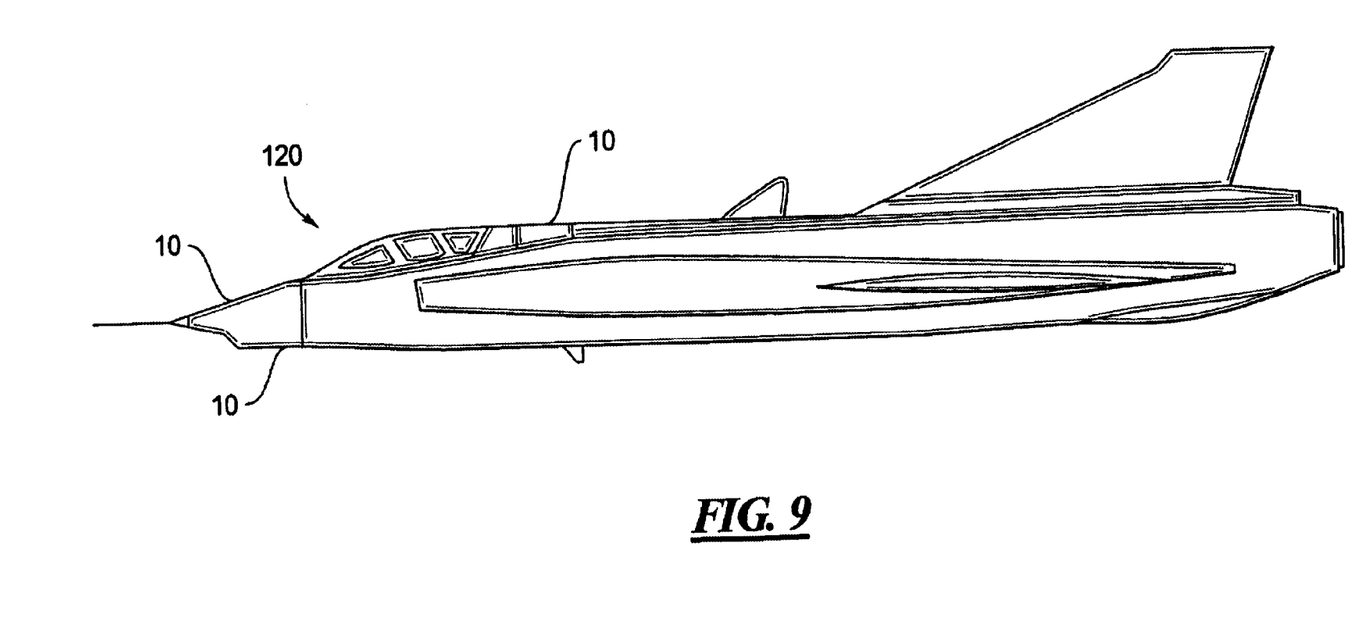
FIG. 9 is a side view of an aircraft on which is provided a plurality of sensors.

It is contemplated that a plurality of such sensor assemblies may be provided on an aircraft 120, as shown in FIG. 9. For example, as many as fourteen sensor assemblies or as few as seven may provided on the forward airframe to measure pressure and air flow of an aircraft. Each sensor assembly has a uniquely shaped plate 10 to match the local surface contours of the aircraft. During servicing of the sensor assembly, the uniquely shaped plate which has been removed is mounted on a new sensor housing and is re-installed on the aircraft. This eliminates the need to stock a different sensor assembly for each mounting location on the aircraft. It also means that a single model of sensor housing may be used on different types of aircraft, with only the mounting plate being specific to the aircraft. Each of the preferred sensor assemblies includes one pressure sensor and a pair of air flow sensors. Each of the sensors also contains a temperature sensor that will be used to compensate the sensor for the effects of temperature. The temperature data will be used to calibrate the pressure sensor and the calibration data stored for correcting measured sensor values.

The sensor data from the present sensor assembly may be used to determine pressure at the sensor location. This pressure data may be used to measure static pressure. The collective data from all of the pressure sensors on the aircraft, as well as temperature data, can be used to determine: dynamic pressure, angle of attack, angle of side slip for the aircraft, total pressure, true airspeed, calibrated airspeed, mach number, air temperature (free stream), pressure altitude, pressure altitude rate, barometric pressure altitude, and air density.

The sensor in a preferred embodiment utilizes an embedded software to measure the values from the single pressure sensor and two flow sensors and will transmit these values via an EIA-485 communications bus. For safety reasons, the communications connections may be redundant. The sensor operation circuitry may include processors, analog to digital converters, and the like, as will be understood by those of skill in the art. In addition to the sensor operation, the circuitry and software controls the heaters.

However, the details of the sensor construction and operation and the software for operation of the sensor are outside the scope of the present application and are therefore not described in further detail.

Although other modifications and changes may be suggested by those skilled in the art, it is the intention of the inventors to embody within the patent warranted hereon all changes and modifications as reasonably and properly come within the scope of their contribution to the art.

We claim:

1. An air data sensor for an aircraft, comprising:
   a mounting plate defining mounting locations for mounting said mounting plate in an aircraft and defining holes through said mounting plate;
   a trap member mounted on said mounting plate and defining a trap chamber in fluid communication with said holes through said mounting plate;
   a pressure sensor in fluid communication with said trap chamber;
   an electrical connector in electrical communication with said pressure sensor.

2. An air data sensor for an aircraft, comprising:
   a flush mounting plate having an exterior surface and an interior surface, said flush mounting plate defining a plurality of holes extending through said flush mounting plate;
   a housing affixed to said flush mounting plate at said interior surface;
   a pressure sensor mounted within said housing;
   a trap member mounted to said interior surface of said flush mounting plate to form a trap chamber, said trap chamber being in fluid communication with said plurality of holes in said flush mounting plate; and
   an air flow tube on said pressure sensor, said air flow tube extending into said trap chamber;
   wherein said flush mounting plate defines a recess on said interior surface; and
   wherein said air flow tube on said pressure sensor includes a free end that extends into said recess.

3. An air data sensor for an aircraft, comprising:
   a flush mounting plate having an exterior surface and an interior surface, said flush mounting plate defining a plurality of holes extending through said flush mounting plate;
   a housing affixed to said flush mounting plate at said interior surface;
   a pressure sensor mounted within said housing;
   a trap member mounted to said interior surface of said flush mounting plate to form a trap chamber, said trap chamber being in fluid communication with said plurality of holes in said flush mounting plate;
   an air flow tube on said pressure sensor, said air flow tube extending into said trap chamber;
   a printed wiring board mounted in said housing; and
   electrical connections between said printed wiring board and said pressure sensor.

4. An air data sensor for an aircraft, comprising:
   a mounting plate defining mounting locations for mounting said mounting plate in an aircraft and defining holes through said mounting plate;
   a trap member mounted on said mounting plate and defining a trap chamber in fluid communication with said holes through said mounting plate;
   a pressure sensor in fluid communication with said trap chamber;
   an electrical connector in electrical communication with said pressure sensor; and
   a printed wiring board in said housing, said pressure sensor being electrically connected to said printed wiring board and said electrical connector being electrically connected to said printed wiring board.

5. A plurality of air data sensors for an aircraft, each of said air data sensors comprising:
   a flush mounting plate having an exterior surface and an interior surface, said flush mounting plate defining a plurality of holes extending through said flush mounting plate;
   a housing affixed to said flush mounting plate at said interior surface;
   a pressure sensor mounted within said housing;
   a trap member mounted to said interior surface of said flush mounting plate to form a trap chamber, said trap chamber being in fluid communication with said plurality of holes in said flush mounting plate;
   an air flow tube on said pressure sensor, said air flow tube extending into said trap chamber;
   wherein said flush mounting plate of each of said air data sensors being of a shape conforming to a local contour of an aircraft skin at its mounting location; and
   said housings being uniform between said plurality of air data sensors so that said flush mounting plates and said housings of said plurality of air data sensors are interchangeable with one another.

6. An air data sensor for an aircraft, comprising:
   a flush mounting plate having an exterior surface with a local surface contour of the aircraft and a substantially planar interior surface, said flush mounting plate defining a plurality of holes extending through said flush mounting plate, said flush mounting plate defining a recess formed in said substantially planar interior surface;
   a housing affixed to said flush mounting plate at said substantially planar interior surface;
   a pressure sensor mounted within said housing;
   a trap member mounted to said substantially planar interior surface of said flush mounting plate to form a trap chamber, said trap chamber being in fluid communication with said plurality of holes in said flush mounting plate; and
   an air flow tube on said pressure sensor, said air flow tube extending into said recess on said substantially planar interior surface and into said trap member.

7. An air data sensor for an aircraft, comprising:
   a flush mounting plate having an exterior surface and an interior surface, said flush mounting plate defining a plurality of holes extending through said flush mounting plate;
   a housing removably affixed to said flush mounting plate at said interior surface;

a pressure sensor mounted within said housing;

a trap member mounted to said interior surface of said flush mounting plate to form a trap chamber, said trap member being within said housing, said trap chamber being in fluid communication with said plurality of holes in said flush mounting plate; and an air flow tube on said pressure sensor, said air flow tube having a free end extending into said trap chamber and adjacent said interior surface of said flush mounting plate.

8. An air data sensor as claimed in claim 7, further comprising:

a drain tube in fluid communication with said trap chamber.

9. An air data sensor as claimed in claim 3, further comprising:

an electrical connector on said housing, said electrical connector being electrically connected to said printed wiring board.

10. An air data sensor as claimed in claim 7, further comprising:

a heater mounted to heat said air flow tube.

11. An air data sensor as claimed in claim 7, further comprising:

a heater mounted to heat said flush mounting plate.

12. An air data sensor as claimed in claim 7, further comprising:

a liquid deflection member in said trap chamber to deflect liquid away from said air flow tube on said pressure sensor.

13. An air data sensor as claimed in claim 7, wherein said flush mounting plate defines a plurality of bolt recesses in said exterior surface for receiving bolts that are accessed from outside an aircraft in which said air data sensor is mounted.

14. An air data sensor as claimed in claim 7, wherein said holes through said flush mounting plate are disposed adjacent a perimeter of said trap chamber.

15. An air data sensor as claimed in claim 1, further comprising:

a housing mounted on said mounting plate, said housing enclosing said pressure sensor, said electrical connector being mounted on said housing.

16. An air data sensor as claimed in claim 1, further comprising:

a fluid drain in fluid communication with said trap chamber.

17. An air data sensor as claimed in claim 7, wherein said housing includes side walls removably secured to said interior surface of said flush mounting plate.

* * * * *